United States Patent [19]

Sakabe

[11] Patent Number: 4,658,328
[45] Date of Patent: Apr. 14, 1987

[54] MONOLITHIC CERAMIC CAPACITOR
[75] Inventor: Yukio Sakabe, Nagaokakyo, Japan
[73] Assignee: Murata Manufacturing Co., Ltd., Japan
[21] Appl. No.: 843,100
[22] Filed: Mar. 24, 1986
[30] Foreign Application Priority Data
  Apr. 11, 1985 [JP] Japan ................... 60-78179
[51] Int. Cl.⁴ .................. H01G 1/14; H01G 4/10
[52] U.S. Cl. ...................... 361/309; 361/321
[58] Field of Search ................. 361/303–306, 361/308–310, 320, 321; 29/25.42

[56] References Cited
U.S. PATENT DOCUMENTS

| | | | |
|---|---|---|---|
| 3,235,939 | 2/1966 | Rodriguez et al. | 29/25.42 |
| 3,648,132 | 3/1972 | Rayburn | 29/25.42 X |
| 3,898,541 | 8/1975 | Weller | 361/321 |
| 4,071,880 | 1/1978 | Rutt | 361/321 X |
| 4,356,529 | 10/1982 | Kopel | 361/309 X |
| 4,466,045 | 8/1984 | Coleman | 361/321 |
| 4,590,537 | 5/1986 | Sakamoto | 361/306 |

Primary Examiner—Donald A. Griffin
Attorney, Agent, or Firm—Ostrolenk, Faber, Gerb & Soffen

[57] ABSTRACT

A monolithic ceramic capacitor which comprises a cofired ceramic body having first and second opposite end surfaces and side surfaces connecting the end surfaces, a plurality of gap layers formed in the fired ceramic body to alternately lead to the first end surface and at least one side surface adjacent to the first end surface, or the second end surface and at least one side surface adjacent to the second end surface, a pair of porous outer electrodes applied to respectively cover the gap layers exposed on the first end surface, of the fired ceramic body and the side surface adjacent to the first end surface and those exposed on the second end surface and the side surface adjacent to the second end surface, and a plurality of inner electrodes connected with either one of the outer electrodes, which inner electrodes are formed by injecting molten metal of lead or lead alloy into the gap layers and solidifying the same.

5 Claims, 10 Drawing Figures

MONOLITHIC CERAMIC CAPACITOR

BACKGROUND OF THE INVENTION

1. Field of the Invention

The present invention relates to a monolithic ceramic capacitor in which inner electrodes are formed by defining gap layers in a ceramic body and injecting molten lead or lead alloy in the same.

2. Description of the Prior Art

An example of the monolithic ceramic capacitor in the aforementioned structure is disclosed in U.S. Pat. No. 4,071,880 issued on Jan. 31, 1978 to Rutt. FIG. 5 shows the structure as disclosed in this prior art.

The monolithic ceramic capacitor as shown in FIG. 5 is formed by pluralities of alternately piled ceramic layers 1 and inner electrodes 2, and double-layer outer electrodes 3a, 4a, 3b and 4b are connected with prescribed ones of the inner electrodes 2.

A description will now be presented of a method of manufacturing such a monolithic ceramic capacitor with reference to FIGS. 6 to 9.

Ceramic green sheets 11A and 11B of, e.g., 50 to 100 μm in thickness shown in FIGS. 6 and 7 are prepared by a doctor blade coater, to print carbon paste 21 prepared by mixing carbon powder and ceramic powder on the surfaces of the ceramic green sheets 11A and 11B. Two types of thus obtained ceramic green sheets 11A and 11B as shown in FIGS. 6 and 7 are alternately piled in plural, to be integrated with each other by application of pressure FIG. 8 shows a green (i.e., before firing) ceramic chip 12 thus obtained. Then the ceramic chip 12 is fired at a temperature over 1000° C. to sinter the ceramic sheets while quenching carbon powder contained in the printed carbon paste 21, thereby to define porous gap layers of the ceramic powder in portions to form the inner electrodes 2 shown in FIG. 5. Thereafter the porous outer electrodes 3a and 3b are applied as shown in FIG. 9. The outer electrodes 3a and 3b are obtained by baking, e.g., paste mainly composed of nickel and mixed with glass frit. The ceramic chip 12 thus obtained is introduced in a pressure vessel to be dipped in molten lead of about 330° to 360° C. in a decompressed state and then pressurized to about 10 atm, thereby to inject, under pressure, the molten lead into the gap layers of the ceramic chip 12 by penetration through the porous outer electrodes 3a and 3b. Then the ceramic chip 12 is lifted up from the molten lead to be cooled and returned to normal pressure, whereby the inner electrodes 2 of lead are formed. Thereafter the outer electrodes 4a and 4b, which are excellent in solderbility, are applied to the surfaces of the outer electrodes 3a and 3b as needed.

In manufacturing of the aforementioned monolithic ceramic capacitor, the porous outer electrodes 3a and 3b are formed in advance of injection of the inner electrodes 2 so as to prevent lead from flowing out from the gap layers in the ceramic chip 12 which is lifted up from the molten lead after injection. In other words, the porous outer electrodes 3a and 3b serve as penetrable barriers. The porous outer electrodes 3a and 3b are mainly formed of nickel, which is non-reactive with lead, and their adhesion to the ceramic sheets 11, i.e., the ceramic chip 12, depends on the amount of glass frit contained in the paste, and adhesion strength thereof is improved by increasing the amount of glass frit. In this case, however, void ratios of the outer electrodes 3a and 3b are lowered, which obstructs penetration of the injected lead, while glass components block the gap layers to prevent introduction of the lead. Thus, electrostatic capacitance cannot be obtained of the designed value even if pressurization is made with sufficient pressure.

SUMMARY OF THE INVENTION

Accordingly, an object of the present invention is to provide a monolithic ceramic capacitor which is high in adhesion strength of outer electrodes while electrostatic capacitance is not substantially lowered from the designed value.

In a wide aspect of the present invention, provided is a monolithic ceramic capacitor which comprises a cofired ceramic body having first and second opposite end surfaces and side surfaces connecting the end surfaces, a plurality of gap layers laminated in the ceramic body through ceramic layers to alternately lead to either the first end surface and at least one side surface adjacent to the first end surface, or the second end surface and at least one side surface adjacent to the second end surface, a pair of porous outer electrodes applied to respectively cover the gap layers exposed on the first end surface and the side surface adjacent thereto and those exposed on the second end surface and the side surface adjacent thereto, and a plurality of inner electrodes formed by injecting molten metal of lead or lead alloy in the gap layers and solidifying the same to be electrically connected with either one of the pair of outer electrodes. In an embodiment of the monolithic ceramic capacitor according to the present invention, the gap layers, into which the molten metal is injected to form the inner electrodes, lead not only to both end surfaces of the ceramic body, but to the side surfaces adjacent to both end surfaces.

Therefore, the molten metal can be injected into the gap layers leading to the side surfaces of the ceramic body, in addition to those leading to both end surfaces thereof. Thus, even if the amount of glass frit contained in the outer electrodes serving as penetrable barriers is increased, the molten metal can be reliably injected into the gap layers. Obtained as the result is a monolithic ceramic capacitor having high adhesion strength of outer electrodes to the ceramic body and electrostatic capacitance substantially of the designed value.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
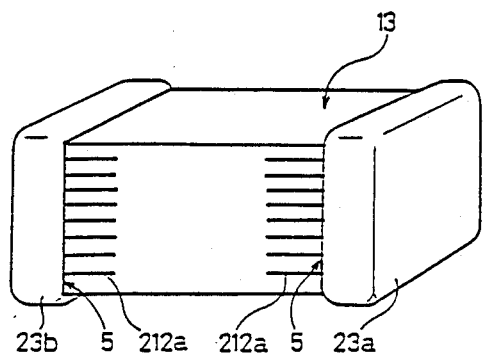
FIG. 1 is a perspective view showing a monolithic ceramic capacitor according to an embodiment of the present invention.
Figure 2:
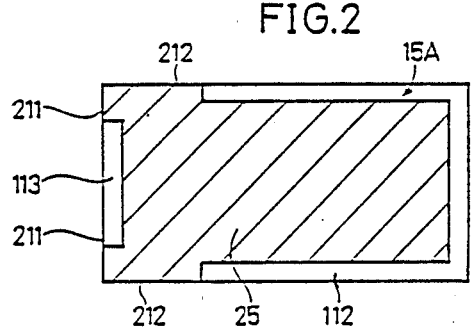
FIGS. 2 and 3 are plan views showing states in which carbon paste is coated on ceramic green sheets employed to form the monolithic ceramic capacitor as shown in FIG. 1.
Figure 3:
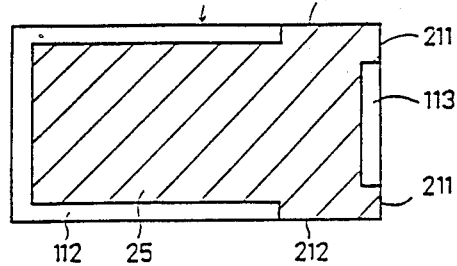

A description will now be presented of an embodiment of the present invention with reference to FIGS. 1 to 3.

Figure 6:
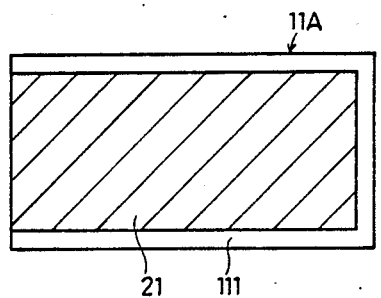
FIGS. 6 and 7 are plan views showing states in which carbon paste is coated on ceramic green sheets employed for manufacturing the conventional monolithic ceramic capacitor as shown in FIG. 5.
Figure 7:
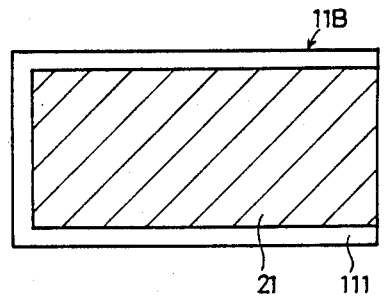

Ceramic green sheets 15A and 15B of 60 μm in thickness were prepared comprising, e.g., barium titanate system ceramic dielectric members having a dielectric constant of 1900 and printed with carbon paste 25 as shown in FIGS. 2 and 3. For the purpose of comparison with the embodiment, ceramic green sheets 11A and 11B printed with carbon paste 21 as shown in FIGS. 6 and 7 were prepared as a reference example and processed under the same conditions. However, the following description will refer exclusively to the embodiment of the present invention unless description of the reference example is necessary.

The carbon paste 25 contained about 5 percent of dielectric powder, thereby to prevent gap layers from being blocked in sintering of the ceramic green sheets 15A and 15B. In the ceramic green sheets 11 of the reference example, the carbon paste 25 was rectangularly printed to provide a margin 111 along three edges of each ceramic green sheet 11A and 11B as shown in FIGS. 6 and 7. A margin 113 was provided at the center of an electrode extracting edge in addition to a margin 112 along the remaining three edges in each of the ceramic green sheets 15A and 15B according to the embodiment, as shown in FIGS. 2 and 3. In other words, the carbon paste 25 was exposed at portions 211 on both sides of the electrode extracting edge while being partially exposed at portions 212 adjacent to end surfaces of each ceramic green sheet 11.

Figure 4:
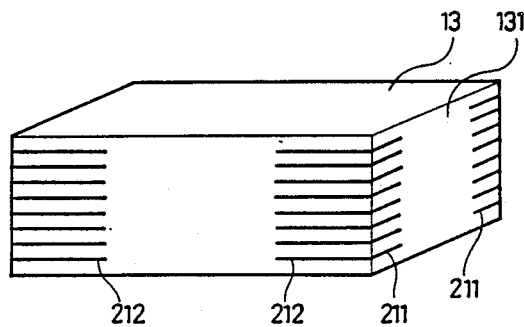
FIG. 4 is a perspective view showing a ceramic body before cofiring which is obtained by laminating the ceramic green sheets as shown in FIGS. 2 and 3 in plural and compressing to integrate the same.
Figure 5:
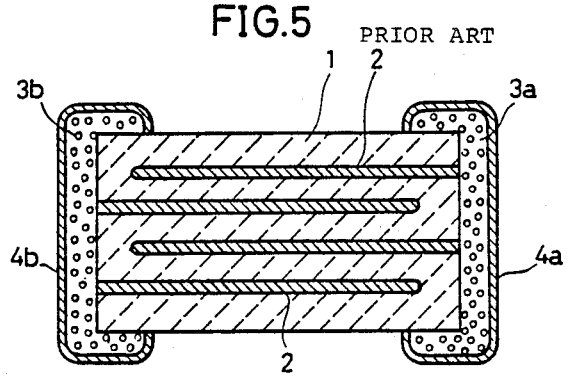
FIG. 5 is a sectional view showing an example of a conventional monolithic ceramic capacitor.
Figure 8:
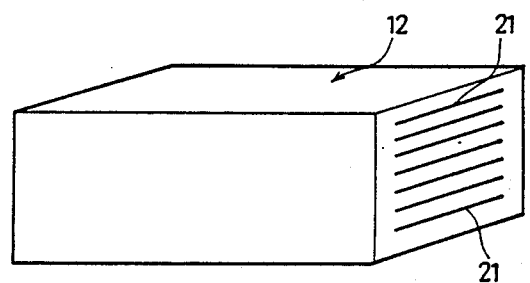
FIG. 8 is a perspective view showing a ceramic body before cofiring which is obtained by laminating the ceramic green sheets as shown in FIGS. 6 and 7 in plural and compressing to integrate the same.

The thirtytwo ceramic green sheets 15A and 15B thus printed with the carbon paste 25 were piled to alternately expose their respective electrode extracting edges, and three ceramic green sheets printed with no such carbon paste were added to the uppermost and lowermost layers, to be integrated with each other under pressure of 1 ton/cm². Consequently, a green ceramic chip 13 before cofiring was obtained according to the embodiment as shown in FIG. 4 while a green ceramic chip 12 as shown in FIG. 8 was obtained as the reference example. As seen in FIG. 4, the exposed portions 211 of the carbon paste 25 appeared on both sides of the end surfaces of the ceramic chip 13 according to this embodiment while the exposed portions 212 of the carbon paste 25 appeared on both of the side surfaces adjacent the end surfaces. However, no carbon paste 25 was exposed on central portions 131 of the end surfaces.

Figure 1A:
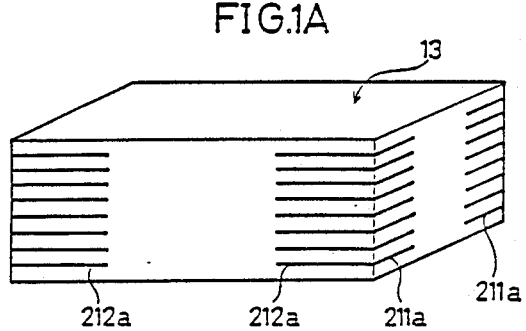
FIG. 1A is a perspective view showing a ceramic sintered body which is employed for manufacturing the monolithic ceramic capacitor as shown in FIG. 1.

These ceramic chips 13 and 12 were fired for two hours at 1320° C. to sinter the ceramic sheets 11A and 11B and 15A and 15B while simultaneously quenching carbon powder contained in the printed carbon pastes 21 and 25, thereby to define porous gap layers of ceramic powder in portions so as to form inner electrodes. In the ceramic chip 13 thus fired, the aforementioned exposed portions 211 and 212 of the carbon paste 25 also defined gap layers 211a and 212a as shown in FIG. 1A. In other words, a plurality of gap layers were laminated between the ceramic layers in the ceramic chip 13 (see FIG. 1A) after firing to alternately lead to either end surface thereof, while the gap layers partially led to, i.e., the same were exposed on, the side surfaces of the ceramic chip 13 at the portions of the gap layers 212a.

Figure 9:
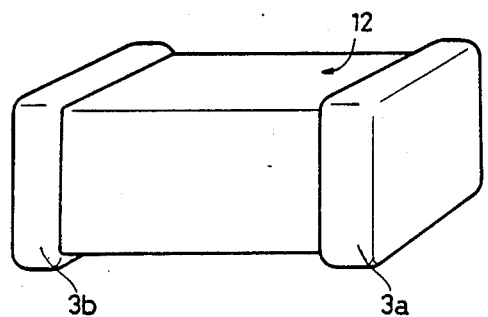
FIG. 9 is a perspective view showing a state in which outer electrodes are applied after cofiring the ceramic body as shown in FIG. 8.

As shown in FIGS. 1 and 9, porous outer electrodes 23a and 23b and 3a and 3b were connected by baking at 600° C. to both end portions of the ceramic chips 13 and 12. The outer electrodes 23a and 23b and 3a and 3b were mainly prepared by nickel, and the amounts of lead borosilicate mixed therein as glass frit were varied from 1 to 10 percent by weight as shown in Table.

The ceramic chip 13 thus obtained was introduced in a molten lead tank in a high-pressure vessel, and pressurized at about 10 atm. after decompression to 10 mmHg to inject the molten lead into the gap layers. Then the ceramic chip 13 was lifted up from the lead tank and cooled. Then the high-pressure vessel was returned to a normal temperature, to take out the ceramic chip 13 from the same. Thus obtained was a monolithic ceramic capacitor comprising the ceramic chip 13 provided with a plurality of inner electrodes in the portions of the gap layers to be respectively connected with the outer electrodes 23a and 23b, as shown in FIG. 1.

The outer electrodes 23a and 23b, mainly composed of nickel containing glass, were inferior in solderability and inconvenient for characteristic evaluation, and hence the surfaces thereof were then subjected to electrolytic plating with Ni-Sn. In order to carry out the present invention, the surfaces of the outer electrodes 23a and 23b may be covered by various types of metal layers having excellent solderability such as those mainly composed of silver, copper, tin, nickel or lead.

The following Table shows values of tensile strength and electrostatic capacitance of the outer electrodes 23a and 23b with varied amounts of glass frit contained therein, with respect to respective 15 samples of the ceramic capacitors according to this embodiment and the reference example.

TABLE

| Glass Frit (wt %) | Invention | | Reference Example | |
|---|---|---|---|---|
| | Tensile Strength (Kg) | Electrostatic Capacitance (nF) | Tensile Strength (Kg) | Electrostatic Capacitance (nF) |
| 1.0 | 0.7 | 150 | 0.1 | 130 |
| 2.0 | 1.5 | 145 | 0.8 | 110 |
| 4.0 | 2.5 | 140 | 1.0 | 30 |
| 6.0 | 3.0 | 142 | 1.5 | less than 1 |
| 8.0 | 3.7 | 127 | 2.5 | less than 1 |
| 10.0 | 3.5 | 105 | 2.5 | less than 1 |

With the amount of glass frit exceeding 2 percent, each capacitor according to this embodiment has tensile strength exceeding 1.5 Kg, which satisfies the required efficiency. Further, the electrostatic capacitance thereof substantially satisfies 150 nF, which is the designed value. On the other hand, although the tensile strength of each reference sample exceeds 1.5 Kg with the amount of glass frit exceeding 6 percent, the electrostatic capacitance thereof is remarkably lowered with increase in the amount of glass frit, to be less than 1 percent of the designed value with the amount of glass frit exceeding 6 percent.

Thus, it is understood that the outer electrodes 23a and 23b are high in tensile strength and the electrostatic capacitance thereof is not lowered, so as to remain substantially at the designed value in the structure of this embodiment, while the electrostatic capacitance of the conventional structure is significantly lowered by improvement in tensile strength with increase in the amount of glass frit.

This is because, with increase in the amount of glass frit, the outer electrodes 3a and 3b are lowered in void ratio which obstructs penetration of lead, while glass enters the gap layers in the ceramic chip 12 upon baking of the outer electrodes 3a and 3b whereby lead cannot be sufficiently injected to satisfactorily form the inner electrodes in the reference example. On the other hand, even if the outer electrodes 23a and 23b are lowered in void ratio or glass contained in the outer electrodes 23a and 23b blocks the gap layers defined under the same, molten lead can be readily injected into the ceramic chip 13 through the gap layers 212a leading to (and which are exposed on) both side surfaces of the ceramic chip 13 as shown in FIG. 1 to satisfactorily form the inner electrodes in the capacitor according to the present invention. Further, the inner electrodes are connected with the outer electrodes 23a and 23b also at junctions 5 between the outer electrodes 23a and 23b and the gap layers 212a, and hence no significant influence is exerted on the entire electrostatic capacitance even if lead flows out from the gap layers when the ceramic chip 13 is lifted up from the molten lead. Thus, reduction of electrostatic capacitance is prevented in this embodiment.

Further, the ceramic chip 13 in this embodiment is provided in the central portions 131 of both end surfaces, i.e., surfaces to which the outer electrodes 23a and 23b are applied, with portions having no gap layers, i.e., with no exposure of inner electrodes (see FIG. 4), whereby the contact area of the outer electrodes 23a and 23b and the ceramic chip 13 is increased to further improve adhesion strength, leading to improvement in tensile strength of the outer electrodes 3a and 3b.

In case where the capacitor according to the present invention is not covered by resin etc., the gap layers 212a exposed on the side surfaces of the ceramic chip 13 may be sealed by coating insulative sealing material such as insulative resin (e.g., epoxy resin), silicon rubber or glass after injection of molten metal, thereby to further improve weather resistance by preventing moisture and gas from entering the interior of the capacitor.

Although an embodiment of the present invention has been described and illustrated in detail, it is clearly understood that the same is by way of illustration and example only and is not to be taken by way of limitation, the scope of the present invention being limited only by the terms of the appended claims.

What is claimed is:

1. A monolithic ceramic capacitor comprising:
    a cofired ceramic body having first and second opposite end surfaces and side surfaces connecting said end surfaces, said ceramic body being provided therein with a plurality of gap layers laminated between ceramic sheets to alternately lead to either said first end surface and at least one said side surface adjacent to said first end surface, or said second end surface and at least one said side surface adjacent to said second end surface;
    a pair of porous outer electrodes being applied to said end surfaces to respectively cover said gap layers exposed on said first end surface of said fired ceramic body and said at least one side surface adjacent to said first end surface, and said gap layers exposed on said second end surface and said at least one side surface adjacent to said second end surface; and
    a plurality of inner electrodes being formed by injecting molten metal comprising lead or lead alloy into said gap layers in said ceramic body and solidifying the same to be electrically connected with respective ones of said pair of outer electrodes.

2. A monolithic ceramic capacitor in accordance with claim 1, wherein portions having no exposed gap layers are provided in centers of said end surfaces of said ceramic body.

3. A monolithic ceramic capacitor in accordance with claim 1, wherein portions of said gap layers leading to said side surfaces of said ceramic body are covered by insulative sealing material applied after injection of said molten metal.

4. A monolithic ceramic capacitor in accordance with claim 1, wherein outer surfaces of said pair of outer electrodes are covered by layers of metal excellent in solderability formed after injection of said molten metal.

5. A monolithic ceramic capacitor in accordance with claim 1, wherein portions of said inner electrodes make electrical contact with said outer electrodes at said side surfaces of said ceramic body.

* * * * *